June 19, 1956 C. W. SUNDBERG 2,751,232
BABY STROLLER AND LATCHING MECHANISM THEREFOR
Filed Oct. 7, 1953 2 Sheets-Sheet 2
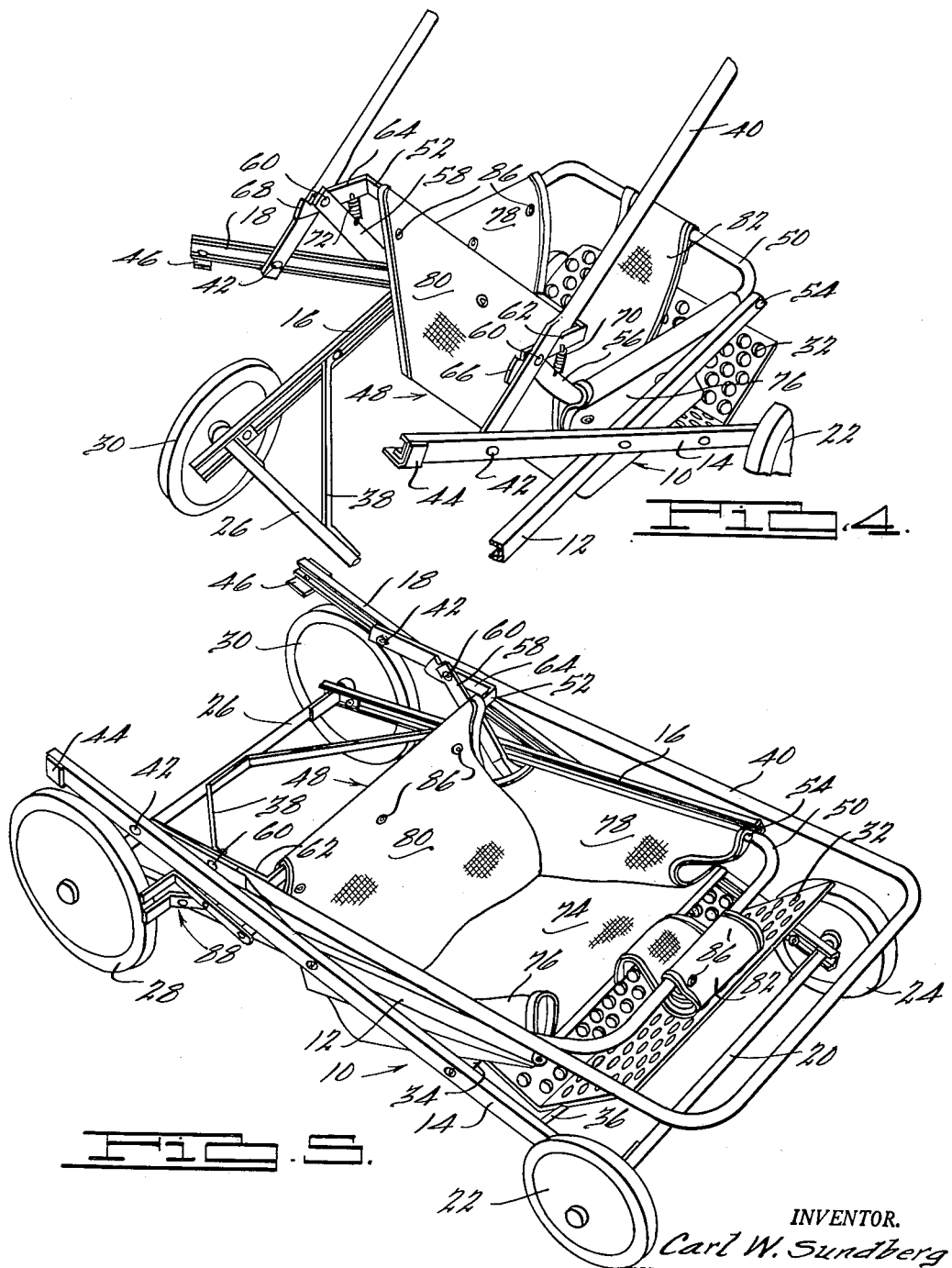
INVENTOR.
Carl W. Sundberg
BY
ATTORNEYS.

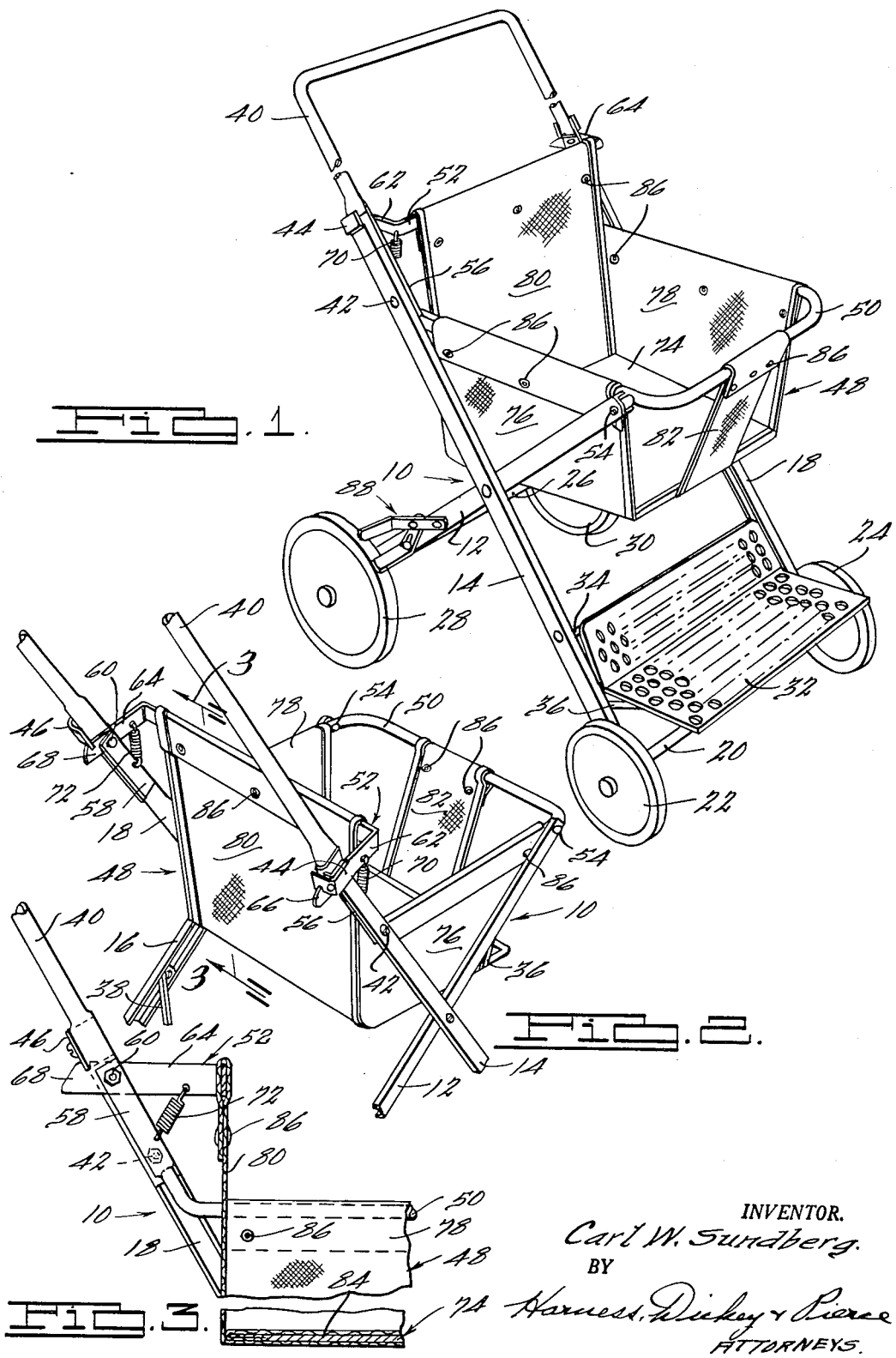

2,751,232

BABY STROLLER AND LATCHING MECHANISM THEREFOR

Carl W. Sundberg, Birmingham, Mich., assignor, by mesne assignments, to Reo Motors, Inc., Lansing, Mich., a corporation of Delaware Application October 7, 1953, Serial No. 384,619

11 Claims. (Cl. 280—41)

This invention relates to new and useful improvements in collapsible baby strollers and the like.

An important object of the present invention is to provide a baby stroller of the collapsible type that is mechanically simple, relatively inexpensive to make and adequately strong and sturdy in use.

Another object of the invention is to provide a baby stroller of the above-mentioned character having a novel latching arrangement for holding the carriage extended or erect.

Still another object of the invention is to provide a baby stroller of the above-mentioned character that is attractive and pleasing in appearance.

Other objects and advantages of the invention will be apparent during the course of the following description.

In the drawings forming a part of this specification and wherein like numerals are employed to designate like parts throughout the same:

Fig. 1 is a perspective view of a baby stroller embodying the invention showing primarily the front and one side of the stroller and illustrating the same in fully erect or extended condition;

Fig. 2 is a fragmentary perspective view showing primarily the rear and one side of the stroller;

Fig. 3 is a fragmentary, vertical, sectional view taken on the line 3—3 of Fig. 2;

Fig. 4 is a fragmentary, perspective view similar to Fig. 2 but showing the stroller partially collapsed; and Fig. 5 is a perspective view showing the stroller fully collapsed.

The main frame 10 of the stroller comprises a pair of erect, crossed, pivotally interconnected support members 12 and 14 at one side of the device and a pair of corresponding support members 16 and 18 at the other side thereof. The lower ends of the members 14 and 18 at the front of the frame 10 are connected by an axle 20, and wheels 22 and 24 are journaled for rotation on the projecting ends of the axle. Similarly, the lower ends of the members 12 and 16 at the rear of the frame 10 are connected by an axle 26, and wheels 28 and 30 are journaled for rotation on the projecting ends of the axle. A footrest 32 is fastened to the support members 14 and 18 adjacent to and above the front wheels 22 and 24 by cross braces 34 and 36, and inasmuch as the cross braces 34 and 36 are essentially rigid they also serve to strengthen and reinforce the entire frame 10. Similarly, a suitable cross brace 38 is provided between the supports 12 and 16 at the rear of the frame 10 to further strengthen and rigidify the frame. As a safety feature, the stroller preferably is provided with a brake 88 which may be of more or less conventional design.

As clearly shown in the drawings the upper portions of the frame supporting members 14 and 18 are substantially longer than the corresponding upper portions of the frame members 12 and 16, and a handle 40 of inverted U-shape arranged with the arm portions thereof between the projecting terminal portions of members 14 and 18 is fastened to the latter by pivots 42 located at about the same level as the upper ends of members 12 and 16. Brackets 44 and 46 welded or otherwise secured to the supporting members 14 and 18 at the upper ends thereof have inwardly extending flange portions engageable by the handle 40 to limit movement thereof on the pivots 42 in a counterclockwise direction as viewed in Fig. 1. When the handle 40 engages the brackets 44 and 46 (Fig. 1) it extends substantially in the plane of the frame-supporting members 14 and 18, but it is significant that the handle is free to swing forwardly on the pivot 42 and away from the brackets 44 as shown in Fig. 4.

A fabric seat 48 is fastened to and suspended from a U-shaped supporting member 50 and a crossbar 52. According to the present invention the U-shaped member 50 is disposed in a generally horizontal plane between the respective crossed members of the frame 10. As perhaps best shown in Fig. 1, the member 50 is connected adjacent the bight portion thereof by pivots 54 to the forward ends of the frame members 12 and 16. The arm portions of the member 50 extend rearwardly from the pivots 54 and terminate in angular, upward extensions 56 and 58 which are fastened by pivots 60 to corresponding arms of the handle 40 adjacent the upper ends of the frame members 14 and 18. When the stroller is erect, as shown in Fig. 1, the main portion of the U-shaped member 50 is essentially horizontal, and the angular extensions 56 and 58 are disposed substantially in the same plane and parallel to the main frame-supporting members 14 and 18.

The crossbar 52 extends between the frame-supporting members 14 and 18 and is provided with rearwardly extending arm portions 62 and 64 preferably interposed between the frame members 14 and 18 and the angular extensions 56 and 58 of the main seat-supporting member 50 for engagement with the pivots 60. Thus the crossbar 52 is secured by the same pivots as the U-shaped member 50 and is free to turn on the pivots independently of the member 50.

It is a feature of this invention that the arms 62 and 64 have rearward extensions 66 and 68 that are suitably notched to engage and interlock with respective brackets 44 and 46. Thus, the brackets 44 and 46 not only serve as stops for limiting upward and rearward swinging movement of the handle 40 but they also function as catches for latch elements defined by the extensions 66 and 68 of the crossbar 52. When the catches 44 and 46 are engaged by latches 66 and 68 the handle 40 is held securely in an upright position as shown in Fig. 1 and the frame 10 cannot fold or collapse. Springs 70 and 72 interconnecting the arms 62 and 64 and extensions 56 and 58 hold the latches 66 and 68 engaged with catches 44 and 46.

The seat 48 here shown has a bottom 74, sides 76 and 78, a back 80, and a front supporting strap 82. As suggested, the seat 48 conveniently can be made substantially entirely of a suitable fabric such as canvas or the like but the fabric of the seat 74 preferably is formed around a stiffening board 84. The two sides 76 and 78 extend upwardly and fold over opposite arms of the main seat-supporting frame 50, and the back 80 folds in a similar manner over the crossbar 52. The front strap 82 extends upwardly from the bottom 74 and folds over the bight portion of the frame 50. Snap fasteners 86 of conventional design on the seat fabric fasten the folded portions of the seat securely but detachably to the main body of the seat.

When it is desired to fold or collapse the stroller, it is necessary merely to lift up on the crossbar 52 against the action of springs 70 and 72 so as to disengage the latch elements 66 and 68 from the catches 44 and 46 and simultaneously to swing the handle 40 forwardly as shown in Fig. 4. A slight downward pressure on the structure causes the parts to fold compactly as shown in Fig. 5. Conversely, to open the frame it is necessary merely to swing the handle 40 upwardly into alignment with the frame cross members 14 and 18 and to pivotally actuate the crossbar 52 so as to engage the latch elements 66 and 68 again with the catches 44 and 46. All of these operations can be performed easily and quickly.

It is a feature of the invention that the crossbar 52 is made to serve a double function in the combination, viz., it functions as a support for the seat 48 and also as a latch for holding the stroller erect. By making the crossbar 52 do all the latching required to hold the stroller in an open or extended condition, it is possible to perform the latching or unlatching operation with one hand. This leaves the other hand free to operate the handle and keeps the entire operation under control at all times. Further, the instant arrangement leaves the hands free where they will not be caught and pinched by parts of the frame as the stroller is collapsed.

Still another advantage derived from utilizing the crossbar 52 both as a latch and as a support for the seat 15 is that the weight of a child in the seat is exerted on the crossbar as a force tending to hold the latch elements 66 and 68 engaged with the catches 44 and 46. Thus, the weight of the child augments the effect of the springs 70 and 72 and makes doubly sure that the stroller will not collapse while occupied.

Substantially all parts of the stroller can be made inexpensively from standard stock materials. The main supporting frame members 12, 14, 16, and 18 preferably are channel-shaped. The front and rear axles 20 and 26 can be made from ordinary rod stock. The handle 40 and the main seat support frame 50 preferably are made from ordinary tubing and the attached two of these members conveniently are flattened for compactness of construction and increased strength. The crossbar 52 and the various braces required to strengthen and reinforce the frame can be made from ordinary bar stock. The structural features which permit substantially every part of the device to be made from ordinary stock materials clearly reduce the cost of production and consequently the price at which the stroller can be made available to the public without in any way sacrificing strength or adversely affecting the appearance of the stroller.

The manner in which the seat 48 is detachably fastened in place is a desirable feature as it permits the seat to be readily removed for cleaning or replacement. The general construction makes it easy to fasten the seat in place or to remove it, and the arrangement is such that these operations can be performed easily and quickly and in a manner most convenient to the user.

Having thus described the invention, I claim:

1. A baby stroller having a collapsible frame including a pair of corresponding support members, catches on said members, a handle connected to said support members, seat-supporting means carried by said frame and including a crossbar having arm portions pivotally connected to said handle and formed with terminal portions projecting beyond the connecting pivots defining latch elements movable upwardly into engagement and downwardly out of engagement with said catches by pivotal actuation of said bar.

2. A baby stroller having a collapsible frame including a pair of corresponding supporting members, catches on said members, a handle having spaced arms pivoted to respective support members below said catches engageable with and supported by said catches in one position thereof, seat-supporting means carried by said frame and including a crossbar having rearwardly extending arms pivoted to respective arms of said handle and formed at the ends thereof with latch elements rockable into and out of engagement with said catches by pivotal actuation of said bar and adapted when engaged therewith to hold said handle securely against said catches, and an infant's seat suspended from said seat-supporting means, said latches being movable upwardly into engagement with said catches by downward actuation of said crossbar whereby the weight of an infant in said seat acts through said crossbar to hold said latch elements engaged with said catches.

3. A baby stroller having a collapsible frame including a pair of corresponding support members, catch elements on said members, a handle having spaced arms pivoted to respective support members below said catch elements, seat-supporting means carried by said frame including a horizontal, generally U-shaped support and a crossbar having rearwardly extending arms, common pivots connecting said U-shaped support and the arm portions of said crossbar to respective arms of said handle, and latch elements on the arms of said crossbar movable into and out of engagement with said catch elements by pivotal actuation of said bar.

4. A baby stroller having a collapsible frame including a pair of corresponding support members, catches on said members, a handle having spaced arms pivoted to respective support members below said catches, seat-supporting means carried by said frame including a horizontal, generally U-shaped support and a crossbar having rearwardly extending arms, common pivots connecting said U-shaped support and the arm portions of said crossbar to respective arms of said handle, the arms of said crossbar having projecting latch elements movable into and out of engagement with said catches by pivotal actuation of said bar, and spring means interconnecting said crossbar and said U-shaped support holding the latch elements normally in engagement with said catches.

5. A baby stroller having a collapsible frame including opposite pairs of upright, crossed and pivotally connected support members, a handle having spaced arms pivoted to corresponding support members at the rear of the frame, seat-supporting means including a horizontal, generally U-shaped member and a crossbar having rearwardly extending arms, said U-shaped member being pivotally connected to corresponding support members at the front of said frame and both said U-shaped member and the arms of said crossbar being connected by common pivots to said handle, the arms of said crossbar having projecting latch elements, and catches on said support members at the rear of the frame engageable by said latches to hold said frame extended and erect.

6. A baby stroller having a collapsible frame including a pair of corresponding support members, catches on said members, a handle having spaced arms pivoted to respective support members below said catches, a generally U-shaped member having angular terminal portions pivoted to respective arms of said handle, a crossbar extending between said arms and having rearwardly extending end portions connected to said arms by the same pivots as said U-shaped member, the end portions of said crossbar having projecting latch elements movable into and out of engagement with said catches by pivotal actuation of said bar, and a fabric seat suspended from said U-shaped member and said crossbar.

7. A baby stroller having a collapsible frame including a pair of corresponding support members, catches on said members, a handle having spaced arms pivoted to respective support members below said catches, a generally U-shaped member having angular terminal portions pivoted to respective arms of said handle, a crossbar extending between said support members and the terminal portions of said U-shaped member having rearwardly extending portions connected to the arms of said handle by the same pivots as said U-shaped member, the mentioned portions of said crossbar having projecting latch elements movable into and out of engagement with said catches by pivotal actuation of said bar, a fabric seat having side portions folded over the arm portions of said U-shaped member, a front strap portion folded over the bight portion of said U-shaped member, and a back portion folded over said crossbar, and snap fasteners on the fabric material of said seat releasably holding said folded portions.

8. A baby stroller having a collapsible frame including a pair of upright, crossed and pivoted support members at each side thereof, catches on corresponding support members at the rear of the frame, a handle having spaced arms pivoted to said corresponding support members below said catches, a generally U-shaped member between and pivoted to corresponding support members at the front of the frame and having angular terminal portions pivoted to respective arms of said handle, and a crossbar disposed transversely with respect to said arms having rearwardly extending end portions connected to said arms by the same pivots as said U-shaped members, the end portions of said crossbar having projecting latch elements movable into and out of engagement with said catches by pivotal actuation of said bar.

9. A baby stroller having a collapsible frame including a pair of upright, crossed and pivoted support members at each side thereof, catches on corresponding support members at the rear of the frame, a handle having spaced arms pivoted to said corresponding support members below said catches, a generally U-shaped member between and pivoted to corresponding support members at the front of the frame and having angular terminal portions pivoted to respective arms of said handle, a crossbar disposed transversely with respect to said arms having rearwardly extending end portions connected to said arms by the same pivots as said U-shaped members, the end portions of said crossbar having projecting latch elements movable into and out of engagement with said catches by pivotal actuation of said bar, and a fabric seat suspended from and jointly supported by said U-shaped member and said crossbar.

10. A baby stroller having a collapsible frame including a pair of upright, crossed and pivoted support members at each side thereof, catches on corresponding support members at the rear of the frame, a handle having spaced arms pivoted to said corresponding support members below said catches, a generally U-shaped member between and pivoted to corresponding support members at the front of the frame and having angular terminal portions pivoted to respective arms of said handle, a crossbar disposed transversely with respect to said arms having rearwardly extending end portions connected to said arms by the same pivots as said U-shaped members, the end portions of said crossbar having projecting latch elements movable into engagement with said catches by downward pivotal actuation of said bar, a fabric seat having side portions folded over the arm portions of said U-shaped member, a front strap portion folded over the bight portion of said U-shaped member, and a back portion folded over said crossbar, and snap fasteners on the fabric material of said seat releasably holding said folded portions.

11. A baby stroller having a collapsible frame including a pair of corresponding support members, catches on said members, seat-carrying means on said frame including a crossbar having angularly disposed arm portions pivotally connected to said frame, the terminals of said arm portions projecting beyond the connecting pivots and defining latch elements engageable with said catches, and an infant's seat suspended from said seat-carrying means, said latch elements being movable upwardly into engagement with said catches by downward actuation of said crossbar whereby the weight of an infant in said seat acts through the crossbar to hold the latch elements engaged with said catches.

References Cited in the file of this patent
UNITED STATES PATENTS 2,063,242     Graser _____ Dec. 8, 1936